US007184758B2

(12) United States Patent
Corneliussen et al.

(10) Patent No.: US 7,184,758 B2
(45) Date of Patent: *Feb. 27, 2007

(54) TRANSFER OF BOOKMARK INFORMATION

(75) Inventors: Soeren Corneliussen, Aalborg (DK);
Flemming Trap, Copenhagen (DK);
Ken Johannesson, Roskilde (DK);
Mika Eronen, Aspen Heights (SG)

(73) Assignee: Nokia Corporation, Espoo (FI)

( * ) Notice: Subject to any disclaimer, the term of this patent is extended or adjusted under 35 U.S.C. 154(b) by 279 days.

This patent is subject to a terminal disclaimer.

(21) Appl. No.: 10/362,587

(22) PCT Filed: Jun. 27, 2001

(86) PCT No.: PCT/IB01/01437

§ 371 (c)(1),
(2), (4) Date: Jul. 30, 2003

(87) PCT Pub. No.: WO02/19658

PCT Pub. Date: Mar. 7, 2002

(65) Prior Publication Data

US 2004/0048603 A1 Mar. 11, 2004

(30) Foreign Application Priority Data

Aug. 29, 2000 (GB) .................................. 0021209.2

(51) Int. Cl.
*H04Q 7/00* (2006.01)
(52) U.S. Cl. ..................................... 455/419; 455/414.1
(58) Field of Classification Search ................ 455/466, 455/414.1, 419
See application file for complete search history.

(56) References Cited

U.S. PATENT DOCUMENTS

| 5,809,415 A | * | 9/1998 | Rossmann | 455/422.1 |
| 5,895,471 A | * | 4/1999 | King et al. | 707/104.1 |
| 6,480,712 B1 | * | 11/2002 | Vigil | 455/412.2 |

(Continued)

FOREIGN PATENT DOCUMENTS

| DE | 198 48 364 A1 | 8/1999 |
| WO | WO 01/33807 A2 | 5/2001 |
| WO | WO 01/33807 A3 | 5/2001 |

OTHER PUBLICATIONS

Nokia Mobile Phones Ltd;*Smart Messaging. Specification*; May 17, 1999; Revision 2.0.0; XP002902152.

Ericsson and Nokia Mobile Phones Ltd; *Over the Air Settings Specification*; Dec. 5, 2000; Approved Version 6.5; XP002902153.

*Primary Examiner*—Matthew D. Anderson
*Assistant Examiner*—Philip J. Sobutka
(74) *Attorney, Agent, or Firm*—Alston & Bird LLP

(57) ABSTRACT

A user browsing the Internet using a personal computer (PC) is able to transfer bookmark information for WAP sites from his PC to his mobile WAP-enabled telephone by clicking on a link on an HTML page, which prompts the user for his mobile phone number and sends the bookmark information to the specified number for subsequent browsing from the WAP-phone. Download of the bookmark information is recorded to enable billing of the provider of the service referenced by the bookmarks or the customer.

38 Claims, 8 Drawing Sheets

U.S. PATENT DOCUMENTS

| | | | |
|---|---|---|---|
| 6,549,773 B1* | 4/2003 | Linden et al. | 455/426.1 |
| 6,610,105 B1* | 8/2003 | Martin et al. | 715/513 |
| 6,633,314 B1* | 10/2003 | Tuli | 715/744 |
| 6,813,503 B1* | 11/2004 | Zillikens et al. | 455/457 |
| 6,826,597 B1* | 11/2004 | Lonnroth et al. | 709/207 |
| 6,895,234 B1* | 5/2005 | Laursen et al. | 455/403 |
| 2001/0014615 A1* | 8/2001 | Dahm et al. | 455/566 |
| 2001/0043234 A1* | 11/2001 | Kotamarti | 345/746 |
| 2001/0047428 A1* | 11/2001 | Hunter | 709/245 |
| 2002/0023059 A1* | 2/2002 | Bari et al. | 705/76 |
| 2002/0023155 A1* | 2/2002 | Clarke | 709/225 |
| 2002/0112014 A1* | 8/2002 | Bennett et al. | 709/206 |
| 2003/0055870 A1* | 3/2003 | Smethers | 709/203 |
| 2003/0203732 A1* | 10/2003 | Eerola | 455/422.1 |

* cited by examiner

TRANSFER OF BOOKMARK INFORMATION

FIELD OF THE INVENTION

This invention relates to the transfer of bookmark information to a mobile telecommunications device and has particular but not exclusive application to mobile telephone handsets and personal digital assistants (PDAs) enabled for wireless application protocol (WAP) operation.

BACKGROUND

Conventional mobile telecommunications devices, such as telephone handsets, have been designed primarily for speech calls and have only a limited capability for handling data. For example, in GSM, a short message service (SMS) has been provided to permit the user to send and receive short text messages that can be transmitted through a cellular public land mobile network (PLMN). More recently, recommendations have been implemented to provide a wireless application protocol (WAP) to promote common standards and specifications for data services that operate over wireless communication networks. WAP-enabled telephone handsets have been developed which allow the user to access remote servers. Data content is provided in a markup language, similar to conventional hypertext markup language (HTML), known as wireless markup language (WML), which is configured to allow data to be displayed as a deck of individual cards which are of a size suited for display on the relatively small display screen usually available on a mobile device such as a cellular telephone handset or PDA.

The mobile device runs a browser, commonly referred to as a microbrowser, to display data from a content server. The browser acts as a client which communicates with the content server via a WAP proxy server or gateway. The primary job of the proxy server is to translate between the WAP protocols used by the browser and the Internet protocols such as http (hypertext transfer protocol) used to communicate with the content server. Navigation between different decks and their respective cards is controlled by the user with keys on the mobile device. Typically, the mobile device has a smaller number of keys than a conventional personal computer and does not have a mouse, so that navigating with the browser of the mobile device can be difficult for the user. In particular, each key on a mobile handset is typically associated with a group of three or more letters of the alphabet, so that a particular letter is chosen by pressing keys a number of times in quick succession. This is by no means a straightforward method of entering long strings of letters, such as those making up a WAP address.

When a WAP enabled mobile telecommunications device is first connected for use with a mobile network, initialisation data to enable the device to connect to the server is supplied to the mobile device through the mobile network, in the form of a data message. For example, the initial data is transmitted in a so-called WAP push, which is a feature of the WAP protocol used for sending unsolicited information from the server to the client.

The push with the initialisation information can be sent as a short message service (SMS) message or as a GSM unstructured supplementary service data (USSD) message. In this way, the mobile device is provided with a number of pre-set server addresses, which can be selected by the user to provide access to information services, commercial organisations and the Internet in general. By providing the settings initially as a push to the handset, the number of keystrokes that need to be performed on the device to access a server are reduced significantly, which simplifies operation for the user.

A user browsing the Internet via a conventional web browser will come across sites which claim to be WAP-enabled. The user may wish to view those sites via his WAP telephone, but can only do so by entering the URL of the site, commonly referred to as a bookmark, into the WAP browser. However, due to the limited user interface described above, it is very difficult to enter bookmarks into the WAP browser.

One of the aims of the present invention is to address this problem.

SUMMARY OF THE INVENTION

According to the present invention, there is provided a method of transmitting bookmark information to a mobile telecommunications device which includes a first client operable to process data which conforms to a first data format, the bookmark information comprising a link to a first server document to be processed by the first client, comprising the steps of using a second client, operable to process data which conforms to a second data format, to connect to a second server document which conforms to the second data format and which includes information relating to the location of the first server document, entering the telephone number of the mobile telecommunications device via the second client, and initiating transmission of the location information to the mobile telecommunications device as the bookmark information.

The first server document can comprise data conforming to the first data format, for example data in WML format.

The invention also provides a method of transmitting bookmark information to a mobile telecommunications device which includes a first client operable to process data which conforms to a first data format, the bookmark information defining the locations of a first bundle of server documents to be processed by the first client, comprising the steps of using a second client, operable to process data which conforms to a second data format, to connect to a second bundle of server documents which includes information relating to the locations of the first bundle of server documents, the second bundle of server documents comprising data which conforms to the second data format, entering the telephone number of the mobile telecommunications device, and initiating transmission of the location information to the mobile telecommunications device as the bookmark information.

By logging transmission of the bookmark data or its reception by a mobile telephone, the provider of the service or content referred to by the bookmark can be billed. Alternatively the user can be billed, for example by using a pre-payment mechanism prior to transmission of the bookmark information.

According to the present invention, there is further provided a computing device for transferring bookmark information to a mobile telecommunications device which includes a first client operable to process data which conforms to a first data format, the bookmark information comprising a link to a first server document to be processed by the first client, comprising a second client, operable to process data which conforms to a second data format, for connecting to a second server document which includes information relating to the location of the first server document, the second server document comprising data which conforms to the second data format, means for entering the telephone number of the mobile telecommunications device, and means for initiating transmission of the location information to the mobile telecommunications device as the bookmark information.

By permitting use of a client such as an HTML browser running on a computer to send bookmark information to a mobile telephone, for example a WAP-enabled telephone, the disadvantages of the limited keyboard functionality of the mobile telephone and any difficulty in navigating between WAP sites, can be obviated.

The computer can be provided as a point-of-sale terminal (POS) or in a publicly accessible kiosk.

According to the present invention, there is further provided a system for entering bookmark information onto a mobile telecommunications device, comprising a mobile telecommunications device configured to receive bookmark information from a remote device, the mobile telecommunications device including a first client operable to process data which conforms to a first data format and the bookmark information comprising a link to a first server document to be processed by the first client and a computing device remote from the mobile telecommunications device, comprising a second client, operable to process data which conforms to a second data format, for connecting to a second server document which includes information relating to the location of the first server document, the second server document comprising data which conforms to the second data format, the computing device further comprising means for entering the telephone number of the mobile telecommunications device and means for initiating transmission of the location information to the mobile telecommunications device as the bookmark information.

The invention also provides a mobile telecommunications device for receiving bookmark information from a remote computing device, the mobile device including a first client operable to process data which conforms to a first data format and the bookmark information comprising a link to a first server document to be processed by the first client, comprising means configured to receive bookmark information from the remote device, wherein the remote device includes a second client, operable to process data which conforms to a second data format, for connecting to a second server document which includes information relating to the location of the first server document, the second server document comprising data which conforms to the second data format.

BRIEF DESCRIPTION OF THE DRAWINGS

Embodiments of the invention will now be described, by way of example, with reference to the accompanying drawings, in which.

DETAILED DESCRIPTION

Figure 1:
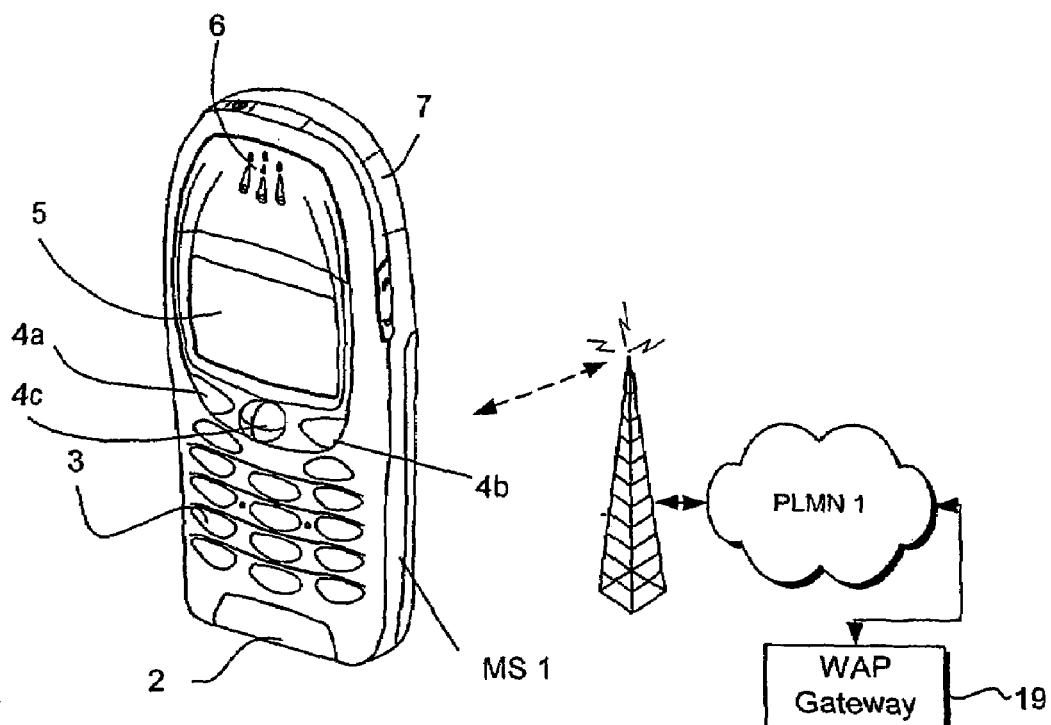
FIG. 1 is a schematic block diagram illustrating a mobile telephone handset which can communicate through a PLMN to a WAP server.

In FIG. 1, a mobile station in the form of a battery driven (battery 17) telephone cellular handset MS1, is shown schematically in radio communication with PLMN 1.

The mobile handset MS1 includes a microphone 2, keypad 3, further keys comprising soft keys 4a, 4b and a navigation key 4c, a liquid crystal display 5, earpiece 6 and internal antenna 7. As will be explained in more detail, the handset MS1 is WAP-enabled. An example of a WAP-enabled mobile handset is the Nokia 6210™.

Figure 2:
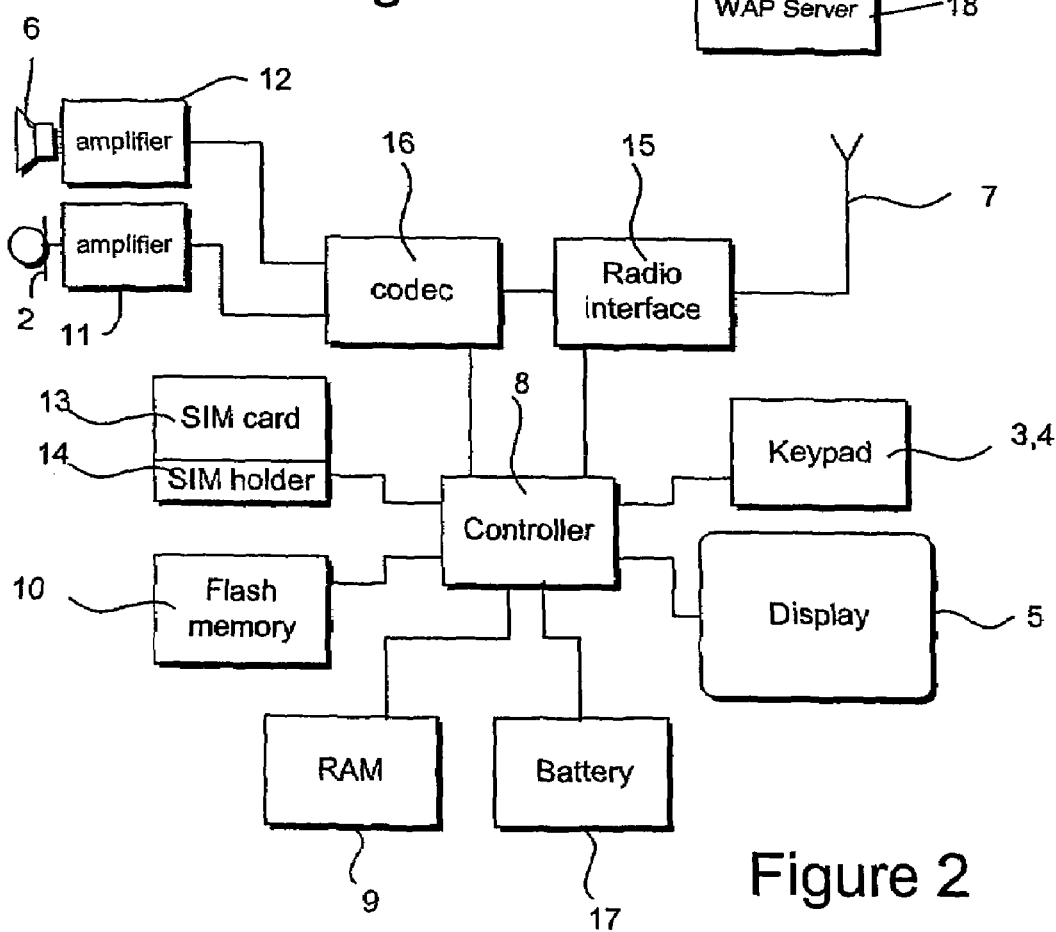
FIG. 2 is a schematic block diagram of the circuitry of the mobile handset shown in FIG. 1.

The circuitry of the handset MS1 is shown in more detail in FIG. 2. Signal processing is carried out under the control of a digital micro-controller 8 which has associated RAM 9 and flash memory 10. Electrical analogue audio signals are produced by microphone 2 and amplified by pre-amplifier 11. Similarly, analogue audio signals are fed to the earpiece 6 through an amplifier 12. The micro-controller receives instruction signals from the keypad 3, soft keys 4a, 4b and navigation key 4c and controls operation of the LCD display 5. The soft-keys 4a, 4b comprise user-programmable keys, while the navigation key 4c comprises, for example, a roller device to perform a scrolling function for the display.

Information concerning the identity of the user is held on a smart card 13 in the form of a GSM SIM card which contains the usual GSM international mobile subscriber identity and encryption $K_i$ that is used for encoding the radio transmission in a manner well known per se. The SIM card 13 is removably received in a SIM card holder 14. Radio signals are transmitted and received by means of the antenna 7 connected through an rf stage 15 to a codec 16 configured to process signals under the control of the micro-controller 8. Thus, in use, for speech, the codec 16 receives analogue signals from the microphone amplifier 11, digitises them into a form suitable for transmission and feeds them to the rf stage 15 for transmission through antenna element 7 to the PLMN 1 shown in FIG. 1. Similarly, signals received from the PLMN 1 are fed through the antenna element to be demodulated by the rf stage 15 and fed to codec 16 so as to produce analogue signals fed to amplifier 12 and earpiece 6.

The handset MS1 is WAP enabled and capable of receiving data in a predetermined channel e.g. for GSM, at 9.6 Kbit/sec. Also, the handset may be configured to receive high speed circuit switched data (HSCSD) according to the GSM recommendations, at a data rate from 14.4–43.2 kbit/sec. It will however be understood that the invention is not restricted to any particular data rate and that higher rates could be used. The WAP content and its applications are specified in a well known set of content formats based on familiar www content formats. WAP is disclosed in the WAP Forum Specifications made by different working groups within the WAP Forum (see also http://www.wapforum.org for technical documentation).

As known in the art, the WAP environment (WAE) provides a browser e.g. a micro-browser operable on the handset as a client, for connection to WAP servers. The browser is configured to operate with WML, which, as previously mentioned, comprises a lightweight markup language similar to HTML but optimised for use in hand-held mobile terminals, WMLScript—a lightweight scripting language similar to Javascript™, wireless telephony application (WTA, WTAI) telephony services and programming interfaces, and content formats—a well known set of data formats including images, phone book records and calendar information.

Data can be downloaded to the browser from a WAP server such as server 18 shown in FIG. 1. The server 18 provides WML decks of cards, corresponding to conventional pages of HTML, such that a deck can be downloaded to the handset MS1 and the individual cards manipulated for display by means of the keys 3, 4. The server 18 is accessed through a gateway 19 which acts as a proxy server. The handset 1 can access the gateway 19 by dialling a predetermined telephone number. The WML data downloaded from the server 18 may be held in the RAM 9 or the flash memory 10. The microcontroller 8 provides the microbrowser functionality and causes individual cards of the downloaded WML deck to be presented to the user via the browser on the screen of the display 5.

In order to simplify operation of the browser on the handset MS1, settings for the browser are 'pushed' to the handset MS1 from the network when the handset is initially connected to the network PLMN 1. Thus, the network provides the handset with telephone numbers and IP addresses for servers that the user can access to receive WAP data.

Figure 3:
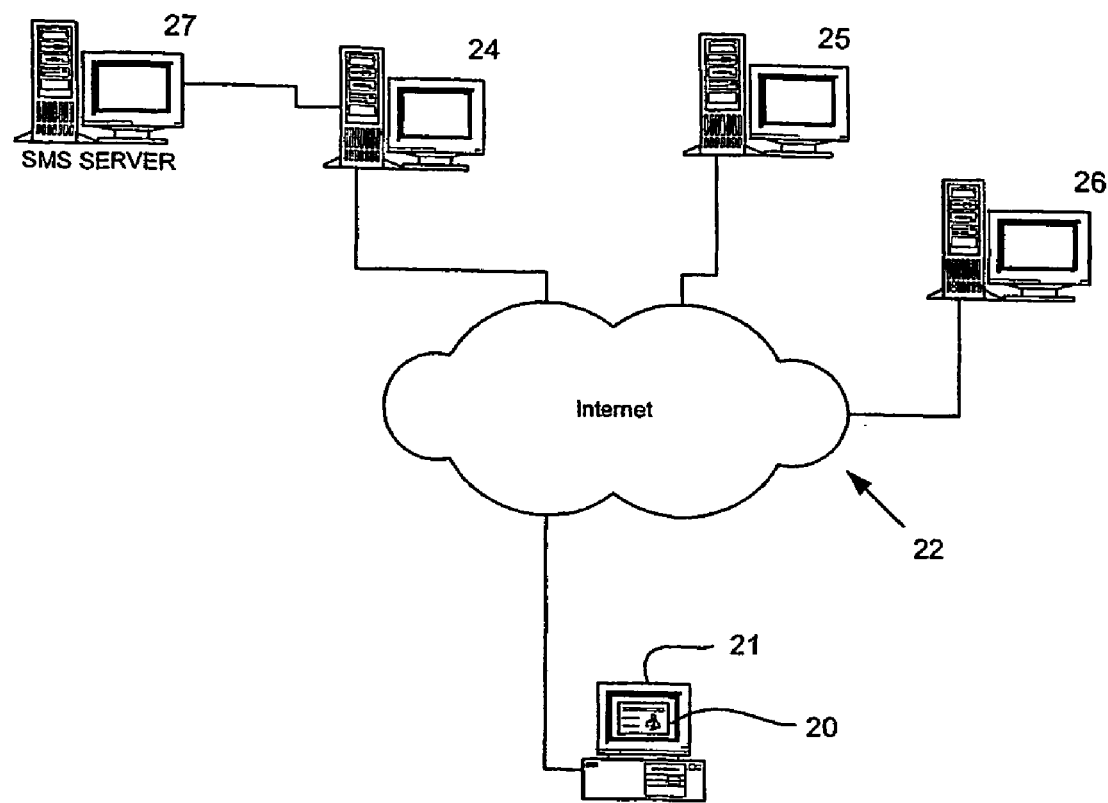
FIG. 3 is a schematic block diagram of a system for implementing the bookmarking process according to the invention.

An example of a system in which an Internet browser is used to bookmark a WAP site for a WAP-enabled telephone is shown in FIG. 3. Conventional web browser software 20, such as Microsoft Internet Explorer™, runs on a personal computer 21, connected to the Internet 22, for example via a leased line or dial up connection. Servers computers 24, 25, 26 include web servers for hosting HTML-based websites which can be displayed by the browser software 20. An SMS server 27 is also available to permit the transmission of SMS messages over a cellular telecommunications network to SMS-enabled mobile telephones.

Figure 4:
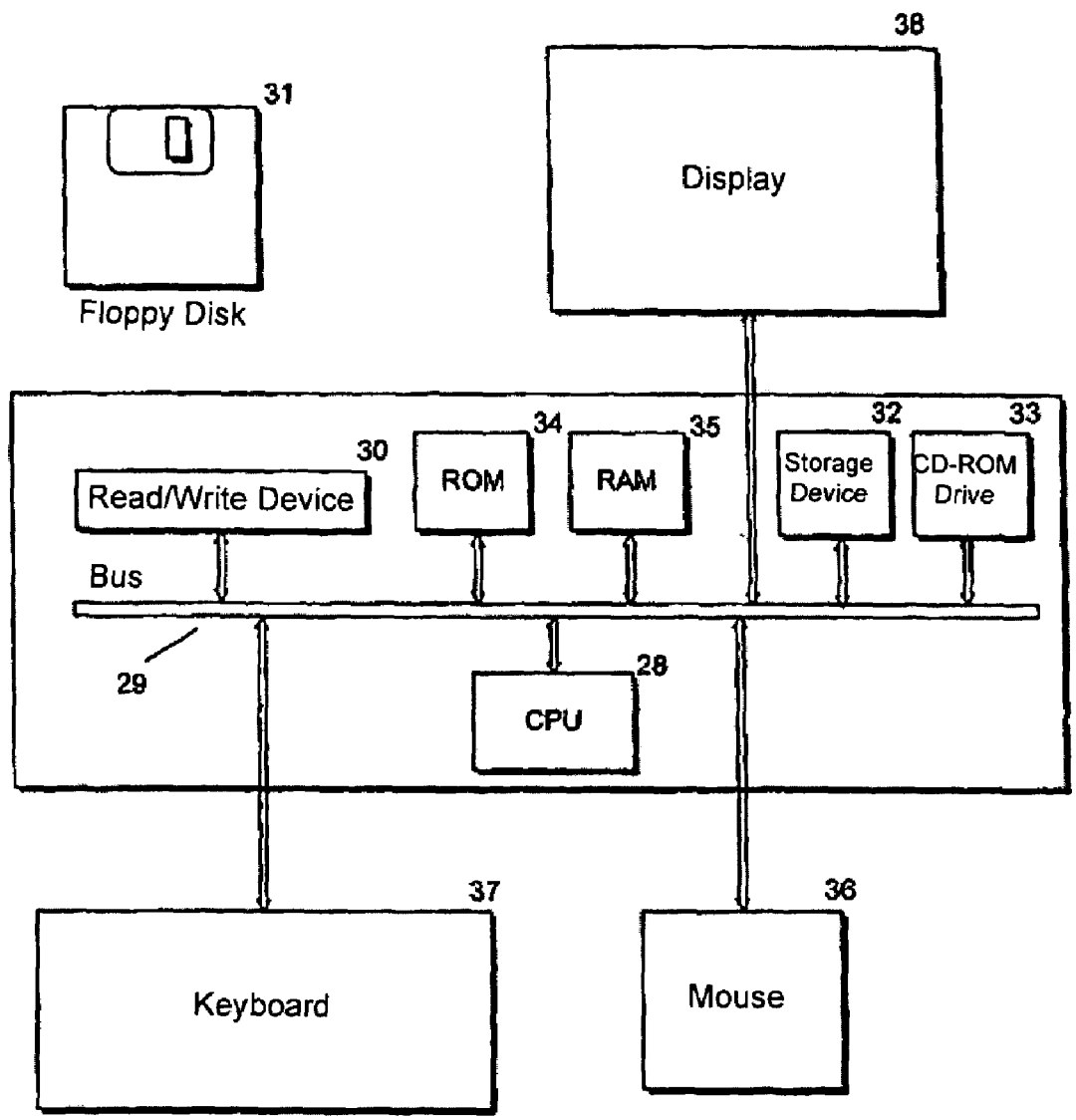
FIG. 4 is a schematic block diagram of a personal computer shown in FIG. 3.

An example of a conventional personal computer is shown in FIG. 4. This comprises a central processing unit (CPU) 28 for executing computer programs and managing and controlling the operation of the computer. The CPU 28 is connected to a number of devices via a bus 29, the devices including a read/write device 30, for example a floppy disk drive for reading and writing data and computer programs to and from a removable storage medium such as a floppy disk 31, a storage device 32, for example a hard disk drive for storing system and application software, a CD-ROM drive 33 and memory devices including ROM 34 and RAM 35. The computer further includes user input/output devices, such as a mouse 36, keyboard 37 and display 38.

Figure 5:
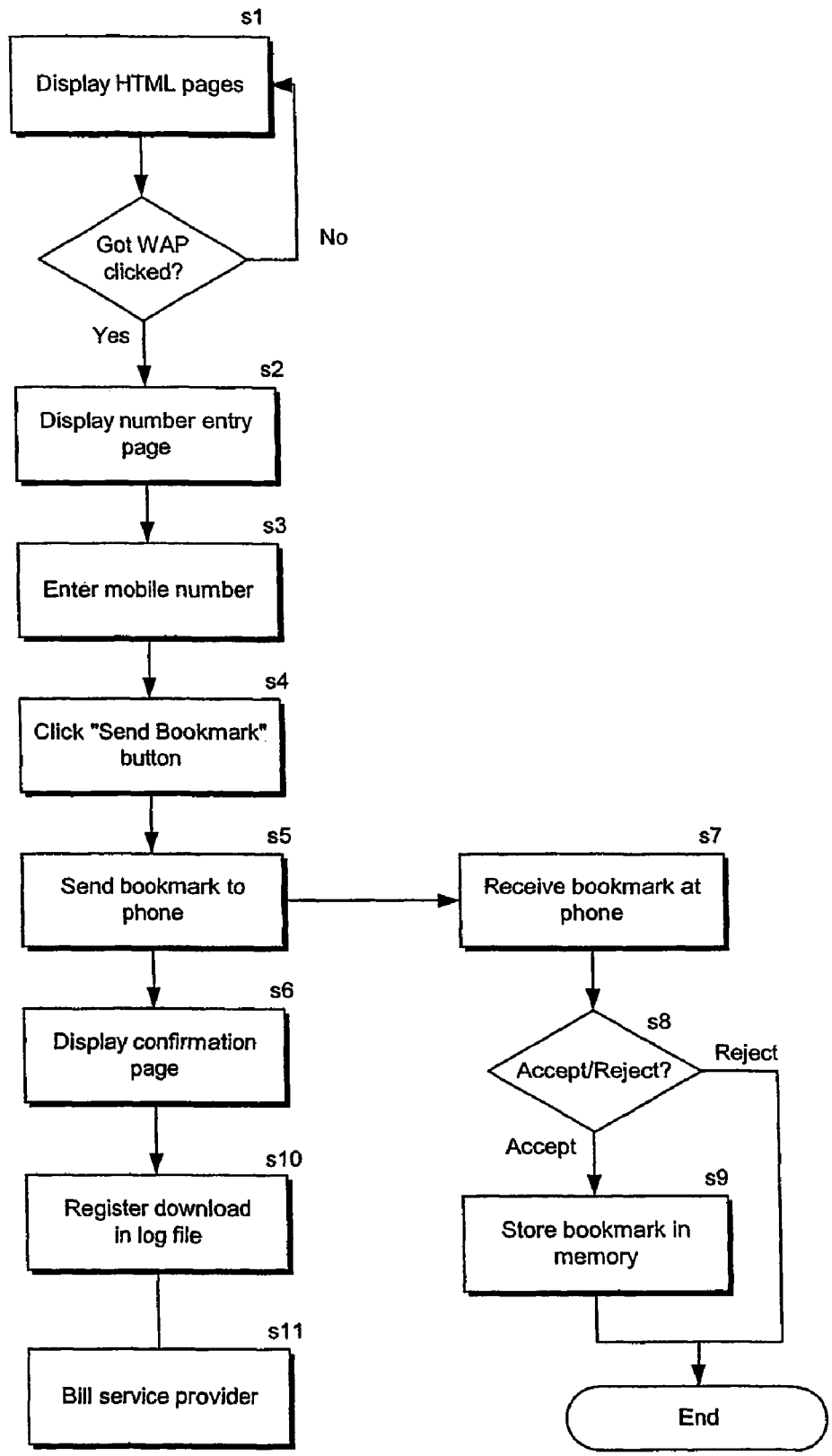
FIG. 5 is a schematic flow chart illustrating the process according to the invention of bookmarking a WAP site via an Internet browser used on a personal computer.
Figure 6:
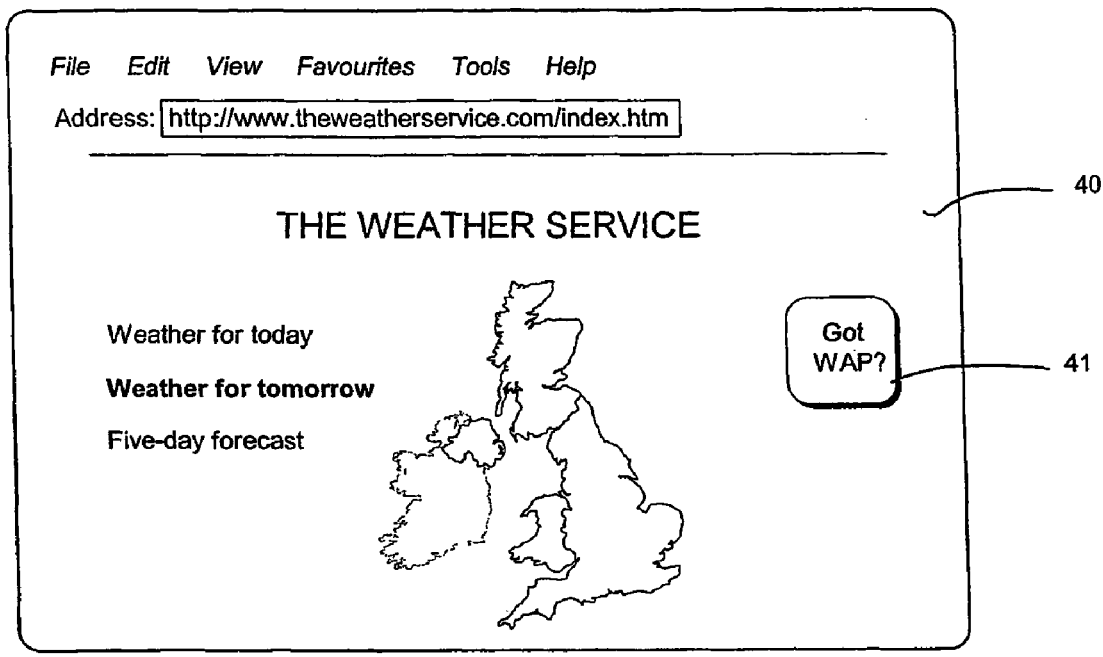
FIG. 6 is an illustration of a web page as viewed in an Internet browser, containing a link to a WAP page in the form of a button on the page.
Figure 7:
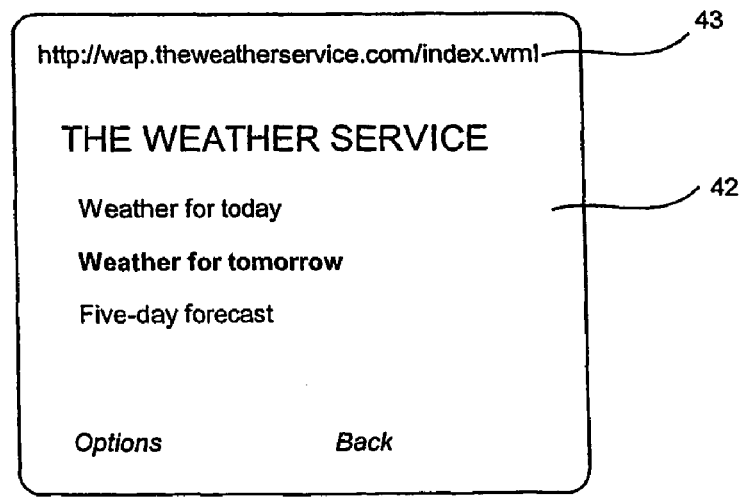
FIG. 7 is an illustration of the WAP page of FIG. 6 as viewed in the microbrowser of a WAP-enabled telephone handset.

Referring to FIG. 5, a user uses a web browser 21 to display HTML pages, in a manner well-known per se (step s1). FIG. 6 is a schematic illustration of an example website 40 hosted by a server computer 25, the website 40 referring to the fact that a version of the data or service presented is also available for a WAP-enabled telephone. For example, the website 40 incorporates a software button 41 which includes an appropriate legend, such as "Got WAP?" The button 41 includes a link to a WAP site hosted by the WAP server 18 which provides the corresponding WAP service. This site is not directly viewable by an HTML browser, but can be viewed by the microbrowser in a WAP-enabled telephone. An example of how the corresponding site 42 would appear on a WAP-enabled telephone is shown in FIG. 7. The example address 43 of the site 42 indicates that the site is a WML, rather than an HTML, site.

Figure 8:
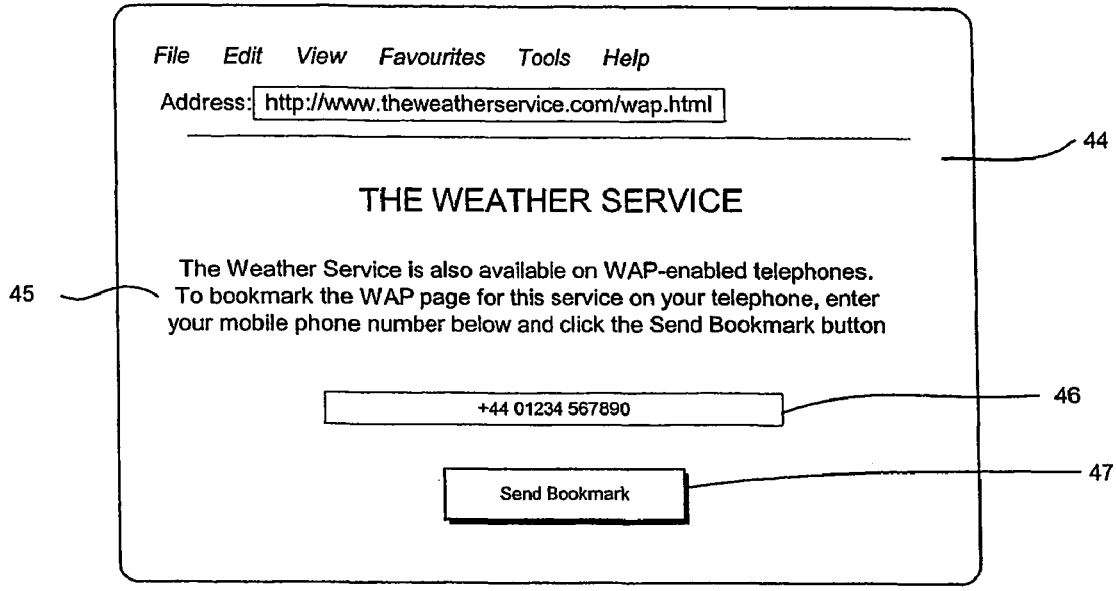
FIG. 8 illustrates a web page to enable entry of a telephone number to which a bookmark to the WAP page is to be sent.
Figure 9:
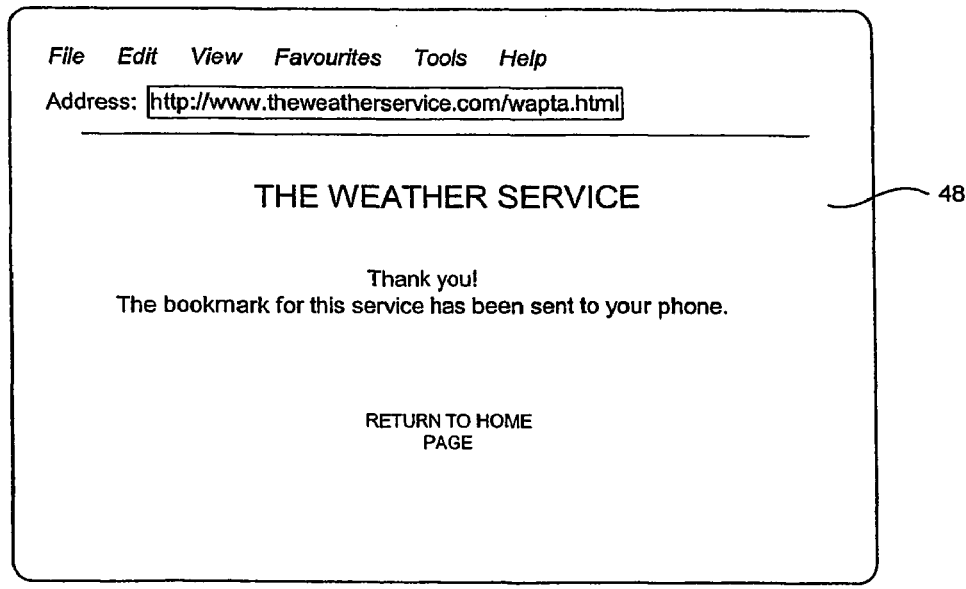
FIG. 9 shows a confirmation web page following sending of the bookmark information referred to in FIG. 8.

Referring again to FIGS. 5 and 6, clicking on the button 41 causes a new HT page 44 to be displayed (step s2), as shown in FIG. 8. Text 45 is displayed which instructs the user to enter his mobile phone number. The user enters his phone number in the space 46 provided (step s3) and then clicks on the "Send Bookmark" button 47 using, for example, his mouse 36 (step s4), which sends the bookmark of the corresponding WAP page to the user's WAP-enabled mobile telephone (step s5) using the GSM short message service (SMS) via the SMS server 27. A further HTML page 48 is then displayed, as shown in FIG. 9, informing the user that the service has been bookmarked on his mobile phone (step s6).

An example of a way in which the web server 25 sends an SMS message to the mobile telephone is described below. An SMS application server 24 provides access to the SMS server 27. When the web server 25 receives the information from the user concerning the bookmark to be sent to the telephone and the telephone number, the web server 25 sends the bookmark title, URL and phone number as simple text strings to the SMS application server 24 using the standard HTTP POST command. The SMS application server 24 builds a binary XML format (WBXML) message from the received data and sends the message to the SMS server 27, which transmits it to the telephone.

Referring again to FIG. 5, when the bookmark information is received at the mobile telephone (step s7), the user is given the option to accept or reject the bookmark (step s8). On acceptance, the bookmark is stored in memory (step s9).

To enable a mobile handset to accept the bookmark information, it is provided in a binary encoded XML (Extensible Markup Language) document identified by the specific MIME-type. MIME is the well-known Multipurpose Internet Mail Extensions specification. The bookmark information is pushed over SMS to a predefined Wireless Datagram Protocol (WDP) port on which the handset always listens. As an example, the bookmark information is defined using the XML 'CHARACTERISTIC' element, with XML 'PARM' (parameter) elements defining the name of the bookmark and its address i.e. the url. For the example given above, the XML document extract shown below illustrates the format of the bookmark information provided to the mobile handset:

```
<CHARACTERISTIC-LIST>
..
..
    <CHARACTERISTIC TYPE = "BOOKMARK">
        <PARM NAME = "NAME" VALUE = "The Weather Service"/>
        <PARM NAME = "URL" VALUE =
        "http://wap.theweatherservice.com"/>
    </CHARACTERISTIC>
</CHARACTERISTIC-LIST>
```

As well as sending individual bookmarks, bookmarks can be sent in groups, so that, for example, a cluster or bundle of related WAP addresses is sent to a WAP-enabled phone.

This can be done by including the bookmarks with the 'CHARACTERISTIC-LIST' set out above.

As a further example, a bookmark can be sent in the vBookmark format defined in the Infrared Mobile Communications (IrMC) specification from the IrDA (Infrared Data Association), as opposed to XML format.

An extract of the vBookmark format is shown below:
BEGIN: VBKM
VERSION: 1.0
URL: http://www.irda.org
TITLE: IrDA home page
BEGIN: ENV
X-IRMC-URL; QUOTED-PRINTABLE:=
[InternetShortcut]=
URL: http://www.irda.org
END: ENV
END: VBKM Referring again to FIG. 5, once the bookmark has been sent, a log file is generated at the server sending the bookmark (step s10) which identifies the owner of the bookmark information for the purpose of billing the download to the owner, for example the provider of the service to which the bookmark relates. All downloads are aggregated over a predetermined period of time and billed to the WAP service provider by the bookmark system operator at agreed rates (step s11).

Figure 10:
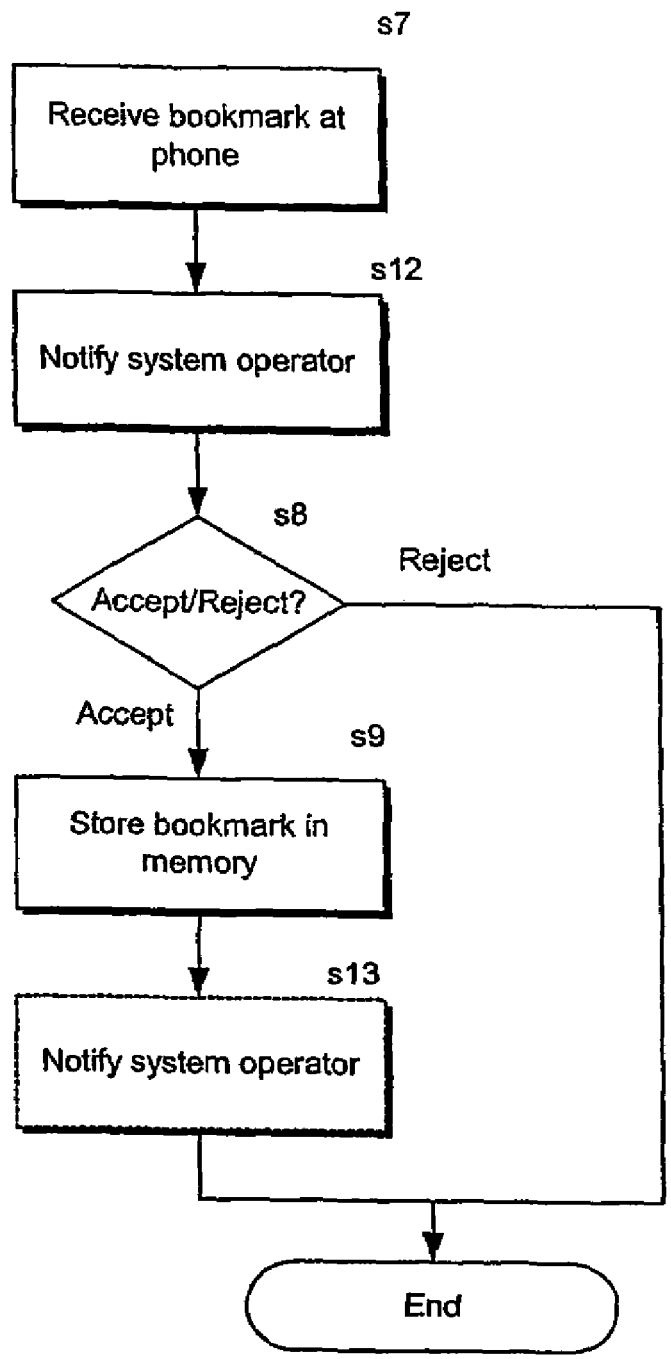
FIG. 10 illustrates an alternative method of tracking user downloads.

Referring to FIG. 10, in an alternative example, reception of a bookmark by the mobile telephone is notified by it to the bookmark system operator using an SMS message for the purpose of billing the customer for all downloads (step s12). This also permits selective billing; for example, a billing notification message is only sent if the bookmark is stored by the user, as indicated in dotted outline in FIG. 10 (step s13).

Figure 11:
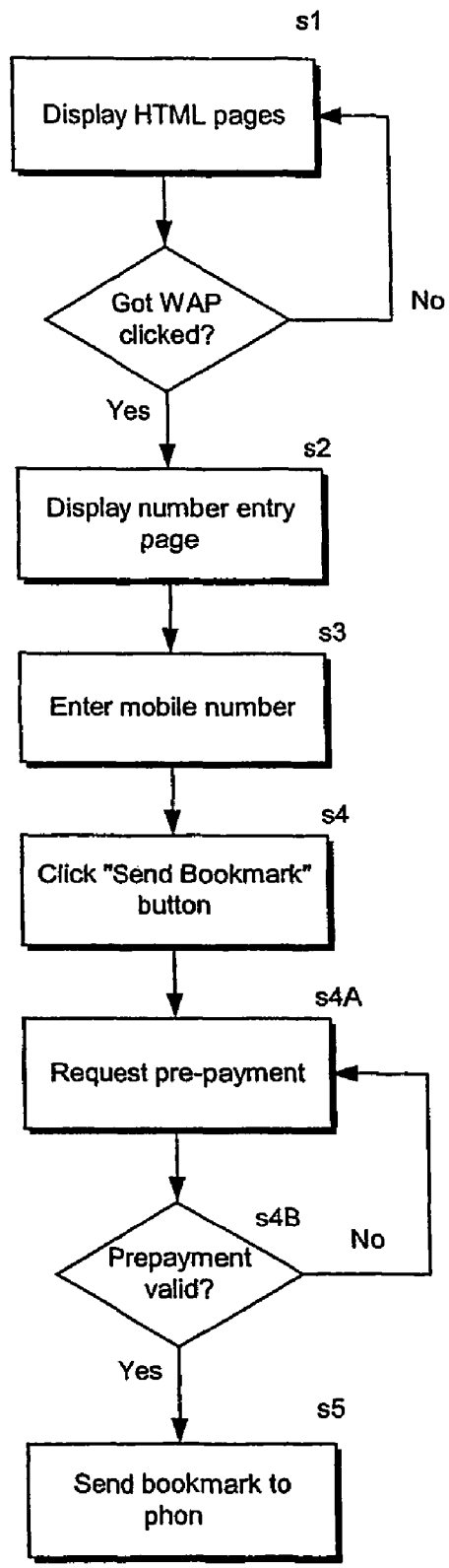
FIG. 11 illustrates a method of pre-paid user billing.

A preferred method of end user billing is shown in FIG. 11, in which steps s1 to s4 are the same as those described in relation to FIG. 5 above, but billing occurs prior to sending the bookmark (step s5), either by deducting from pre-paid vouchers or by a coin or token system, for example, where a public kiosk or point of sale terminal is used to provide access to the bookmark information. The terminal requests a pre-payment for the bookmark from a user (step s4A), checks that the pre-payment is valid (step s4B) and if it is valid, proceeds to send the bookmark to the user's mobile telephone.

While the invention has been primarily described with reference to WAP bookmarks, the bookmarks could also be conventional web bookmarks, where the mobile telecommunications device includes a web browser.

The invention claimed is:

1. A method of transmitting bookmark information to a mobile telecommunications device which includes a first client operable to process data which conforms to a first data format, the bookmark information comprising a link to a first server document to be processed by the first client, comprising:
    using a second client, operable to process data which conforms to a second data format, to connect to a second server document which conforms to the second data format and which includes location information relating to the location of the first server document, wherein the location information comprises a link to the location of the first server document;
    requesting a user of the second client to enter a telephone number of the mobile telecommunications device to which the bookmark information is to be sent via the second client; and
    initiating transmission of the location information to the mobile telecommunications device as the bookmark information, the bookmark information being configured for the mobile telecommunications device to subsequently retrieve the first server document.

2. A method according to claim 1, wherein the first server document comprises data conforming to the first data format.

3. A method according to claim 1, wherein the location information comprises a URL address.

4. A method according to claim 1, further comprising presenting an indication to a user that the first server document is available from the second server document.

5. A method according to claim 4, wherein the indication is an icon within the second server document.

6. A method according to claim 4, further comprising the step of acting on the indication.

7. A method according to claim 6, wherein the step of acting on the indication includes selecting the icon.

8. A method according to claim 6, further comprising the step of requesting the telephone number in response to the indication being acted upon.

9. A method according to claim 1, further comprising sending the bookmark information as a short message service (SMS) message.

10. A method according to claim 1, wherein the first client processes data by displaying the data at the mobile telecommunications device.

11. A method according to claim 1, further comprising receiving the bookmark information at the mobile telecommunications device, and on receipt, presenting to a user of the mobile device the option of accepting or rejecting the bookmark information.

12. A method according to claim 1, wherein the first server document comprises a first bundle of server documents and the second server document comprises a second bundle of server documents.

13. A method of transmitting bookmark information to a mobile telecommunications device which includes a first client operable to process data which conforms to a first data format, the bookmark information defining the locations of a first bundle of server documents to be processed by the first client, comprising:
    using a second client, operable to process data which conforms to a second data format, to connect to a second bundle of server documents which includes location information relating to the locations of the first bundle of server documents, the second bundle of server documents comprising data which conforms to the second data format, and wherein the location information comprises links to the locations of the first bundle of server documents;
    requesting a user of the second client to enter a telephone number of the mobile telecommunications device to which the bookmark information is to be sent; and
    initiating transmission of the location information to the mobile telecommunications device as the bookmark information, the bookmark information being configured for the mobile telecommunications device to subsequently retrieve at least one of the server documents of the first bundle of server documents.

14. A method according to claim 13, further comprising registering the transmission of the bookmark information to said mobile telecommunications device.

15. A method according to claim 14, wherein the first client is located on a client-side and the second client is located on a server-side of a communications network, comprising maintaining a log file for registering transmission of the bookmark information at the server-side of the network.

16. A method according to claim 13, further comprising registering reception of the bookmark information by the mobile telecommunications device.

17. A method according to claim 16, wherein the first client is located on a client-side and the second client is located on a server-side of a communications network and the step of registering reception of the bookmark information by the mobile telecommunications device comprises transmitting a message from the mobile telecommunications device to a server located on the server-side of the network.

18. A method according to claim 14, comprising using the registration for billing the transmission of the bookmark information.

19. A method according to claim 18, comprising billing on a credit basis.

20. A method according to claim 13 comprising requesting pre-payment from a user prior to sending the bookmark information.

21. A computing device for transferring bookmark information to a mobile telecommunications device which includes a first client operable to process data which conforms to a first data format, the bookmark information comprising a link to a first server document to be processed by the first client, comprising:
  a second client, operable to process data which conforms to a second data format, for connecting to a second server document which includes location information relating to the location of the first server document, the second server document comprising data which conforms to the second data format, and wherein the location information comprises a link to the location of the first server document;
  a number entry module for entering a telephone number of the mobile telecommunications device; and
  a sending module for initiating transmission of the location information to the mobile telecommunications device as the bookmark information, the bookmark information being configured for the mobile telecommunications device to subsequently retrieve the first server document.

22. A device according to claim 21, further comprising means for selecting the location information.

23. A device according to claim 21, wherein the first data format comprises wireless markup language (WML) format.

24. A device according to claim 21, wherein the first client comprises a microbrowser.

25. A device according to claim 21, wherein the second data format comprises hypertext markup language (HTML) format.

26. A device according to claim 25, wherein the second client comprises an HTML browser.

27. A device according to claim 21, comprising a kiosk terminal.

28. A device according to claim 21, comprising a client computer in a client-server environment.

29. A device according to claim 28, further comprising one or more servers for providing the first and second server documents.

30. A device according to claim 28, further comprising an SMS server for sending the bookmark information to the mobile telecommunications device via a cellular network.

31. A device according to claim 30, further comprising an SMS application server for providing the SMS server with data in WAP Binary XML content format (WBXML).

32. A device according to claim 28, wherein the client-server environment comprises the Internet.

33. A device according to claim 21, wherein the first client is operable to initiate a transmission to a provider of the bookmark information to register the transmission of the bookmark information to said mobile telecommunications device.

34. A system for entering bookmark information onto a mobile telecommunications device, comprising:
  a mobile telecommunications device configured to receive bookmark information from a remote device, the mobile telecommunications device including a first client operable to process data which conforms to a first data format and the bookmark information comprising a link to a first server document to be processed by the first client; and
  a computing device remote from the mobile telecommunications device, comprising a second client, operable to process data which conforms to a second data format, for connecting to a second server document which includes location information relating to the location of the first server document, the second server document comprising data which conforms to the second data format, wherein the location information comprises a link to the location of the first server document, the computing device further comprising a number entry module for entering a telephone number of the mobile telecommunications device and a sending module for initiating transmission of the location information to the mobile telecommunications device as the bookmark information, the bookmark information being configured for the mobile telecommunications device to subsequently retrieve the first server document.

35. A system according to claim 34, wherein the computing device further comprises means for selecting the location information.

36. A system according to claim 34, further comprising a SMS application server for providing an SMS message in WAP Binary XML content format (WBXML).

37. A mobile telecommunications device for receiving bookmark information from a remote computing device, the mobile device including a first client operable to process data which conforms to a first data format and the bookmark information comprising a link to a first server document to be processed by the first client, the mobile telecommunications device further comprising a receiver for receiving bookmark information from the remote device, the remote device having transmitted the bookmark information at least partially in response to a user of the remote device entering a telephone number of the mobile telecommunications device, wherein the remote device includes a second client, operable to process data which conforms to a second data format, for connecting to a second server document which includes location information relating to the location of the first server document, the second server document comprising data which conforms to the second data format, wherein the location information comprises a link to the location of the first server document, the location information being configured for the mobile telecommunications device to subsequently retrieve the first server document.

38. A device according to claim 37 operable to transmit a message to a provider of the bookmark information to register reception of the bookmark information by the mobile telecommunications device.

* * * * *

UNITED STATES PATENT AND TRADEMARK OFFICE
CERTIFICATE OF CORRECTION

PATENT NO. : 7,184,758 B2  Page 1 of 1
APPLICATION NO. : 10/362587
DATED : February 27, 2007
INVENTOR(S) : Corneliussen et al.

It is certified that error appears in the above-identified patent and that said Letters Patent is hereby corrected as shown below:

Title page, (*) Notice, cancel "This patent is subject to a terminal disclaimer".

Signed and Sealed this

Tenth Day of June, 2008

JON W. DUDAS
*Director of the United States Patent and Trademark Office*